Figure 1:
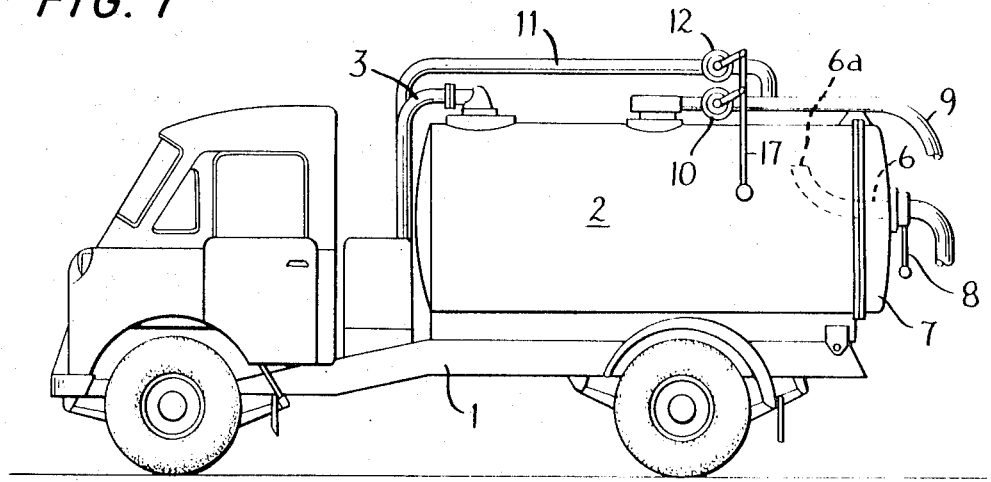

United States Patent

[11] 3,621,893

| [72] | Inventors | Minoru Nishimura;<br>Yasuo Doi, both of Kobe-shi, Japan |
|---|---|---|
| [21] | Appl. No. | 856,698 |
| [22] | Filed | Sept. 10, 1969 |
| [45] | Patented | Nov. 23, 1971 |
| [73] | Assignee | Shin Meiwa Kogyo Kabushiki Kaisha<br>Kobe-shi, Japan |

[54] SUCTION HOSE CLEANING DEVICE FOR FILTH CAR
3 Claims, 2 Drawing Figs.

[52] U.S. Cl. .................................................. 141/65,
15/314, 134/166, 137/205, 141/90, 141/231,
222/148, 239/172
[51] Int. Cl. ........................................................ B65b 31/04

[50] Field of Search ............................................ 141/65, 66,
89, 90, 91, 231; 15/314, 352; 134/166 C, 167, 168,
169; 222/144.5, 145, 148; 239/148, 172; 137/209,
237-240

[56] References Cited
UNITED STATES PATENTS

| 2,664,911 | 1/1954 | Thompson et al. ............ | 137/205 |
| 3,125,294 | 3/1964 | Lill .............................. | 239/172 |
| 3,136,485 | 6/1964 | Bellows et al. ................. | 239/172 |
| 3,267,509 | 8/1966 | Boyd ............................ | 15/314 |

Primary Examiner—Houston S. Bell, Jr.
Attorney—John B. Armentrout

ABSTRACT: A suction hose of a filth car is associated with a fluid blow pipe having changeover valve means for using fluid discharged under pressure for the purpose of blowing off foreign matter from a clogged portion of the suction hose.

SUCTION HOSE CLEANING DEVICE FOR FILTH CAR

The present invention relates to vacuum filth-intake cars, and more particularly relates to a cleaning device equipped for intake of filth on suction through a hose and for operating on positive pressure to free the hose of a clog.

A filth car or so-called "vacuum car" is used for removing fluid or filth from a contaminated area. This kind of car is usually provided with a vacuum tank which will take in filth through a suction hose so as to load the car.

If any solid matter of considerable size is contained in the filth during operation of the suction hose, it will come into the hose and will be trapped in a bend or restricted area of the hose thereby arresting further intake. In such case, a filth tank, which interiorly is normally maintained under vacuum conditions for the purpose of achieving intake, has required conversation to a positive pressure in the prior art so as to direct pressurized air into the suction hose for blowing off a clog. However, an extremely high air pressure after the latter has become clogged has been necessary in the tank to remove foreign matter from the suction hose. Also the filth tank per se must be made rugged unduly for such operations. If the suction hose is partially clogged during intake thereby leaving a cavity in the clog, fluid flow will merely pass through the cavity without removing any clog. Further, where the tank which has been maintained under vacuum conditions for normal vacuum operation is positively pressurized adequately and the pressure is transmitted to erase a partial or a full clog and then is brought back again to a vacuum condition after completion of the blowing operation, the accompanying power consumption increases unduly, thereby lowering efficiency of operation. Hence, an object of the present invention is to provide suction hose cleaning of a clogged suction hose under conditions which avoid positive pressurization of the filth car tank and enable prompt resumption of normal vacuum cleaning operations through use of the hose having intake to the tank.

Another object of the present invention is to provide a suction hose cleaning arrangement in a filth car which will avoid need for making the tank per se unduly rugged. A further object of the present invention is to provide a suction hose cleaning arrangement for a filth car which will enable foreign matter to be removed from a clogged suction hose although the hose may be either wholly or partially clogged. A further object of the present invention is to provide a suction hose cleaning arrangement for a filth car which will reduce the power consumption and improve efficiency of operation in contrast to prior art devices.

According to the present invention, there is provided a suction hose having one end thereof opened into the tank and the other end provided with a suction inlet for taking in filth, and an associated conduit is connected to an intermediate portion of the above mentioned suction hose. The associated conduit is connected at the other end thereof to the positive pressure output side of a vacuum pump or to a different pump so as to receive positive pressure. A valve for the operation of filth intake or that of clog removal to be selected is provided.

Figure 2:
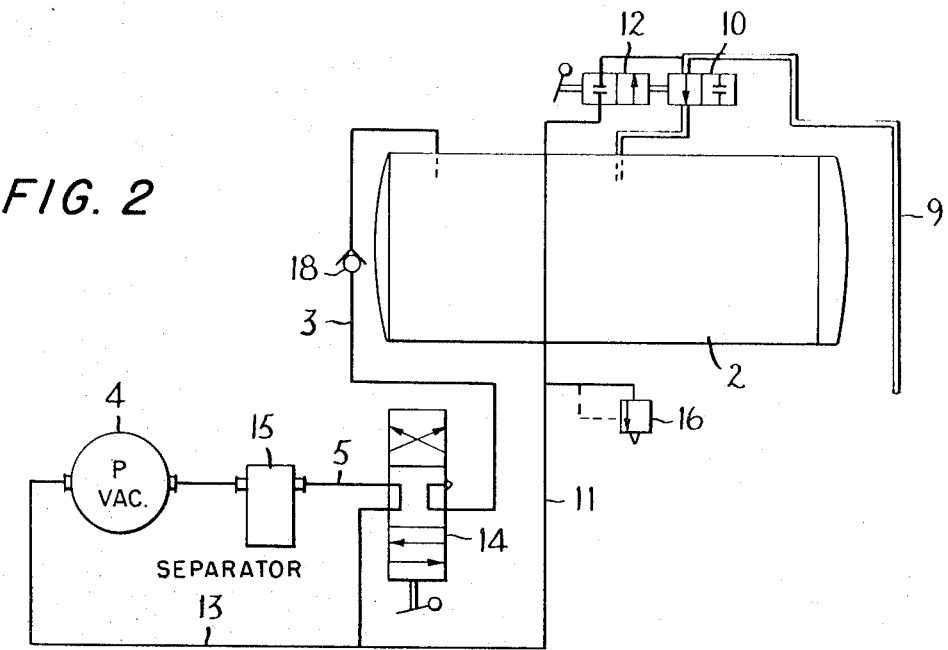

Other objects and advantages of the present invention will become more distinct by referring to the detailed description made in conjunction with accompanying drawings, in which FIG. 1 is a general side elevation view showing a filth car provided with the device according to the present invention, and FIG. 2 is a schematic view showing a piping arrangement according to the present invention.

Referring to the drawings, a tank 2 is supported hinged at one end thereof on a body 1 of a car so that filth can be dumped from the tank. A suction pipe 3 is connected to an upper portion of the tank 2 at one end thereof, and to a suction pipe 5 of a vacuum pump 4 at the other end. A discharge or drain pipe 6 for supernatant liquid is rotatably mounted on a rear end plate 7 of the tank 2 at a center thereof so that the pipe 6 may be rotated by means of a lever 8 so as to have its inner end 6a submerged in liquid or raised therefrom. A suction hose 9 has one end thereof opened into the tank 2 and is connected in an intermediate portion thereof to a pipeline 11 which is in turn connected to the positive pressure output side of the vacuum pump 4 or to the positive pressure output side of a different pump (not shown). A stop valve 10 is provided on the hose 9 between a position where the hose is opened into the tank 2 and a position where the hose is connected to the pipeline 11. The stop valve 10 is associated with another stop valve 12 provided on the pipeline 11 so that the former will be opened or closed when the latter is closed or opened. A three-way valve 14 is provided between the suction pipe 3, a suction side 5 of the vacuum pump 4 and a delivery side 13 of the latter pump. A check valve 18 is provided on the suction pipe 3 in the intermediate portion of the latter so as to prevent any backward flow of air into the tank 2 from occurring. A separator 15 is provided on the suction side 5 of the vacuum pump 4, and a relief valve 16 is provided on the pipeline 11 in the intermediate portion thereof. A lever 17 is provided so as to have the stop valve 10 and 12 operated in associated manner.

In operation, if the three-way valve 14 is shifted downward from the position in FIG. 2 for filth to be taken into the tank 2, air within the tank 2 will be taken to the vacuum pump 4 through the suction pipe 3, the check valve 18, the three-way valve 14 and the suction side 5 of the vacuum pump 4, and then discharged into atmosphere through the discharge pipe 13 and the three-way valve 14. At this time, if the stop valve 10 is open and the stop valve 12 closed having an open end of the suction hose 9 immersed in a pool of filth, the filth will be taken into the tank 2 under vacuum through the suction hose 9 at a rate dependent upon degree of vacuum within the tank 2. On the other hand, air discharged into the pipe 13 from pump 4 will flow also into the pipeline 11, but is prevented from being directed into the suction hose 9 by means of the stop valve 12.

Should the suction hose 9 become clogged partially or completely, to the extent that subsequent filth intake is arrested, as by means of foreign matter, such as sticks and stones, trapped in bends of the hose 9 and restricted portions of joint fittings, the above-mentioned lever 17 may be operated again so as to have the stop valve 10 closed with the stop valve 12 opened, and further the three-way valve 14 may be shifted upward from the position viewed in FIG. 2. Then, the vacuum pump 4 will take air directly from atmosphere through the three-way valve 14 and the suction side pipe 5, and discharged air from the vacuum pump 4 will be directed into the suction hose 9 through the discharge side pipe 13, the pipe line 11 and the open stop valve 12 so as to cause fluid within the suction hose 9 to be directed backwardly thereby eliminating a clogged condition within the suction hose 9. In the meantime, the discharged air from the vacuum pump 4 will flow also into the suction pipe 3, but is prevented from entering the tank 2 by means of the check valve 18. Therefore, the tank 2 meanwhile is maintained in a predetermined vacuum condition. Also, air directed into the suction hose 9 through the pipe line 11 will be stopped by the closed valve 10 and hence will not enter the tank 2.

Should the suction hose 9 become more obstinately clogged, the stop valve 12 may be closed so as to obtain high pressure buildup within the pipe line 11 on operation of pump 4 and thereafter be opened for delivering a burst of high-pressure air into the suction hose for removing the clog.

When the three-way valve 14 is shifted downwardly from the position viewed in FIG. 2, and the stop valve 10 is opened and the stop valve 12 closed after the suction hose 9 has been cleaned, filth can be taken into the tank 2 immediately through the suction hose 9.

When the tank 2 is fully loaded with the filth, three-way valve 14 may be brought back into neutral position shown in FIG. 2. When the filth is divided into filth water and slime in the tank 2, atmospheric air may if desired be introduced into the tank 2 in any suitable manner and the drain pipe 6 will discharge the water through having the inner end 6a of the drain pipe positioned immersed in the water by manipulating the lever 8. Discharge of filth water from the tank may instead be carried out under the effect of a separate discharge pump particularly provided for filth water draining purposes such as to drain the filth water forcibly from the tank 2 while filth intake operation of the tank is continued.

Pressurized water may be used, in place of pressurized air, for removing clogs from suction hose 9. In this case, a fresh water tank for clog removal may be mounted on the body 2 of the car, or a separate pump may be provided for discharging filth water from the tank 2, and directing this discharged filth water into the suction hose 9 through a pipe branched off from a filth water discharge pipe which is used in place of the pipeline 11.

While a preferred embodiment according to the present invention has been described hereinabove, it will be understood that various changes and modifications may be made within the spirit of the present invention as described in the appended claims.

What is claimed is:

1. In a vacuum filth-intake car, the combination which includes a tank, changeover valve means comprising first and second inlets, first and second outlets, and means for connecting selectively either said first inlet with said first outlet and shutting off communication between said second inlet and said second outlet or said second inlet with said second outlet and shutting off communication between said first inlet and said first outlet, said first outlet being connected communicating with the interior of said tank, a first conduit connected communicating with said first inlet, a second conduit and a check valve, said second conduit connected communicating with the interior of said tank and through said tank interior with said first outlet and communicating for said check valve to close against back-flow of fluid through said second conduit into said tank, a third conduit connected communicating with said second inlet having said second outlet connected communicating with said first conduit, and pressurizing means for producing and selectively imposing positive and negative pressure effects and connected with said second conduit and said check valve and with said third conduit for by selection imposing negative pressure effects in said second conduit and said check valve and thence in said tank with option of having said first inlet open through said changeover valve means to said first outlet while having said second inlet closed off through said changeover valve means from said second outlet, and for by selection imposing positive pressure effects in said third conduit while having said check valve closed and while by option having said second inlet open through said changeover valve means to said second outlet and said first conduit and said first inlet closed off from said first outlet.

2. In a vacuum filth-intake car, the combination as set forth in claim 1 wherein said pressurizing means includes, a pump for producing said positive and negative pressure effects respectively on output and intake sides thereof, and selector valve means characterized by having a first port therein communicating with the atmosphere, a second port therein connected communicating with said second conduit and said check valve, a third port therein connected communicating with said pump intake side and with said third conduit through said pump and said pump output side, and a fourth port therein connected communicating with said third conduit on said pump output side, with said selector valve means further including shiftable means having passages therein for in a first position of said shiftable means effecting interconnection of said second and third ports and interconnection of said first and fourth ports for said pump to have intake from said second conduit and said check valve and output to the atmosphere through said selector valve means, and for in a second position of said shiftable means effecting interconnection of said first port with said third port and said second port with said fourth port for said pump to have intake from atmosphere through said selector valve means and output to said third conduit while connected through said selector valve means with said second conduit and said check valve against back-flow of fluid into said tank.

3. In a vacuum filth-intake car, the combination as set forth in claim 1 wherein said means for connecting selectively either said first inlet with said first outlet and shutting off communication between said second inlet and said second outlet or said second inlet with said second outlet and shutting off communication between said first inlet and said first outlet, includes interconnected first and second selector portions and a control in common to said first and second selector portions, for movement of said first selector portion for opening said first inlet to said first outlet to be accompanied by movement of said second selector portion for shutting off communication between said second inlet and outlet, and for movement of said second selector portion for opening said second inlet to said second outlet to be accompanied by movement of said first selector portion for shutting off communication between said first inlet and outlet.

* * * * *